United States Patent
Zax et al.

(10) Patent No.: US 7,544,390 B2
(45) Date of Patent: Jun. 9, 2009

(54) SYSTEM AND METHOD FOR CREATING GRAPHICS ON GLASS SURFACES

(75) Inventors: Adam Zax, Capistrano Beach, CA (US); Carl C. Christ, Santa Cruz, CA (US)

(73) Assignee: Visual Ice, Inc., San Clemente, CA (US)

( * ) Notice: Subject to any disclaimer, the term of this patent is extended or adjusted under 35 U.S.C. 154(b) by 62 days.

(21) Appl. No.: 11/031,818

(22) Filed: Jan. 6, 2005

(65) Prior Publication Data

US 2005/0271820 A1 Dec. 8, 2005

Related U.S. Application Data

(60) Provisional application No. 60/577,141, filed on Jun. 4, 2004.

(51) Int. Cl.
*B05D 1/32* (2006.01)
(52) U.S. Cl. ................................ 427/282; 427/287
(58) Field of Classification Search .................. None
See application file for complete search history.

(56) References Cited

U.S. PATENT DOCUMENTS

| | | | |
|---|---|---|---|
| 2002/0037402 A1* | 3/2002 | Yamazaki et al. | 428/336 |
| 2003/0108725 A1* | 6/2003 | Hamilton et al. | 428/195.1 |
| 2003/0224108 A1* | 12/2003 | Pollara | 427/271 |
| 2007/0003700 A1* | 1/2007 | Roche et al. | 427/372.2 |

FOREIGN PATENT DOCUMENTS

| JP | 10-194782 | | 12/1996 |
|---|---|---|---|
| JP | 10-194782 | * | 7/1998 |

* cited by examiner

*Primary Examiner*—Frederick J Parker
(74) *Attorney, Agent, or Firm*—Myers Andras Sherman LLP; Vic Lin

(57) ABSTRACT

A surface is masked or stenciled off in a specific pattern or design and treated with a liquid or vapor chemical composition. The resulting pattern or design on the surface is substantially invisible in the absence of condensation. As the surface is subject to a temperature change, for example, moved from a cooler ambient to a warmer ambient, the specific pattern or design becomes visible as a result of selective condensation.

13 Claims, 4 Drawing Sheets

SYSTEM AND METHOD FOR CREATING GRAPHICS ON GLASS SURFACES

CROSS REFERENCE TO RELATED APPLICATIONS

This application relates to and claims priority from U.S. Provisional Application Ser. No. 60/577,141 filed on Jun. 4, 2004 entitled "SYSTEM AND METHOD FOR CREATING ADVERTISING AND PROMOTIONAL GRAPHICS ON GLASS FREEZER AND REFRIGERATOR DOORS", the disclosure of which is incorporated herein by reference as if fully set forth.

FIELD OF THE INVENTION

The present invention relates to advertising and promotional graphics and, more particularly to graphic images that appear and disappear on the surfaces of glass or other transparent or translucent silica based freezer and refrigerator doors under the influence of a temperature or humidity differential.

BACKGROUND OF THE INVENTION

Much of contemporary supermarket marketing materials are concerned with attracting a consumer's attention in novel and exciting ways. Containers, whether for dry goods, or refrigerated or frozen goods, are very colorful and often highlight a producer's or packager's tradename or mark, in highly visually intensive forms. Indeed, much, if not most, of the merchandising effort is made with a view towards keeping a tradename or trademark uppermost in the consumer's consciousness.

Marks are often graphical in nature and lend themselves to visual display. However, frozen or refrigerated products are contained within controlled environments where the goods are kept behind doors that, although made of glass, are nevertheless closed. There is little opportunity for tradename display apart from that placed on the product packages themselves.

Conventionally, marks, logos or other related graphical images are placed on or in the vicinity of freezer or refrigerator doors by way of surface adhering appliqués. Trademarks or tradenames might be applied to a film substrate as a printed layer, in contrasting colors, or provided as a paper or plastic card, poster, or the like, with the logo prominently printed thereon. Contemporary graphical displays are little more than posters in that they are generally opaque, either completely, or in those areas that contain the logo or graphic.

Further, conventional displays are adhered to the surface with adhesives that are very difficult to clean off when it becomes desirable to change the merchandising display. The glues often cause discoloration and may mar the glass surface of the door. Opaque materials are also quite disadvantageous, in that they prevent consumers from seeing the entire contents of the freezer or refrigerator, while only a single vendor or product is highlighted. Vendors unwilling or unable to supply a market with their own appliqué graphics would nevertheless be very upset if their products were hidden from view by a competitive banner.

Accordingly, there is a need for some method of implementing a graphical image or design on a glass freezer or refrigerator door in such a way as to maintain the integrity and clarity of the glass. The image presentation should be made so that the image does not interfere with complete vision through the door, but is also clearly and unambiguously visible.

These contradictory requirements have heretofore been unobtainable. Visual images have been either visible, in which case they interfere with complete vision through the door, or the converse, in which case they are invisible and serve no purpose. The present invention implements these contradictory requirements in an image presentation system and method that accommodates both complete vision through, for example, a glass, plastic, or other transparent or translucent material, freezer or refrigerator door, and a clear and unambiguously visible image.

SUMMARY OF THE INVENTION

A method for imaging graphical objects on an otherwise transparent surface comprises providing the graphical object as a stencil, affixing the stencil to the surface of a transparent or translucent sheet of material and applying a transparent surface smoothing composition to the stencil, such that the composition contacts the surface of the transparent material through open regions of the stencil. A graphical object is imaged upon the transparent material surface, as the surface is transitioned from a cooler ambient to a warmer ambient, the graphical object is imaged against the transparent material surface as a region of contrast between areas having the presence or absence of condensation droplets.

In one aspect of the invention, the transparent material is a transparent glass or plastic sheet, with the stencil being applied to an inner surface of the glass sheet. The glass or plastic sheet might be provided as a door, window, side covering or other surface of a refrigerator or freezer, where transitioning the covering functions to move the surface from a cooler ambient to a warmer ambient, thereby causing condensation. Transitioning takes the form of either moving the material surface from one ambient to another, such as opening or closing a door, or changing the ambient across the material surface, such as blowing warmer or cooler air across the surface.

Advantageously, the glass or plastic material surface is characterized by a first surface roughness Ra and wherein the transparent surface smoothing composition is characterized by a second surface roughness less than the first. Characteristically, the second surface roughness is about one order of magnitude less than the first surface roughness. Additionally, the transparent surface smoothing composition has an index of refraction substantially the same as the glass or plastic sheet, such that the composition is not visible when the glass and composition are in thermal equilibrium.

In a further aspect, the invention comprises a method for imaging patterns and designs on a transparent material sheet having inner and outer surfaces. The method comprises providing a stencil, which defines the pattern or design, applying the stencil to a surface of the glass or plastic sheet and applying a surface smoothing composition to the glass or plastic surface such that the composition contacts the surface through open regions of the stencil so as to transfer the pattern or design to the glass. The pattern or design is imaged upon the material surface as the surface is transitioned from a cooler ambient to a warmer ambient, the pattern or design imaged against the material surface as the presence or absence of condensation droplets.

Specifically, the transparent surface smoothing composition is a film selected from the group consisting of silicon or silane containing films, siloxanes, silicon oils, diamond-like carbons, polymers, copolymers, oligomers, petroleum distillates, liquid plastics, acrylics, acetates, and resins. The composition is devised to have substantially the same index of refraction as the material sheet such that the pattern or design is not visible when the composition and material sheet are in thermal equilibrium.

DESCRIPTION OF THE DRAWINGS

These and other features, aspects and advantages of the present invention will be more fully understood when considered with respect to the following specification, appended claims and accompanying drawings, wherein:

DETAILED DESCRIPTION OF THE PREFERRED EMBODIMENTS

Figure 1:
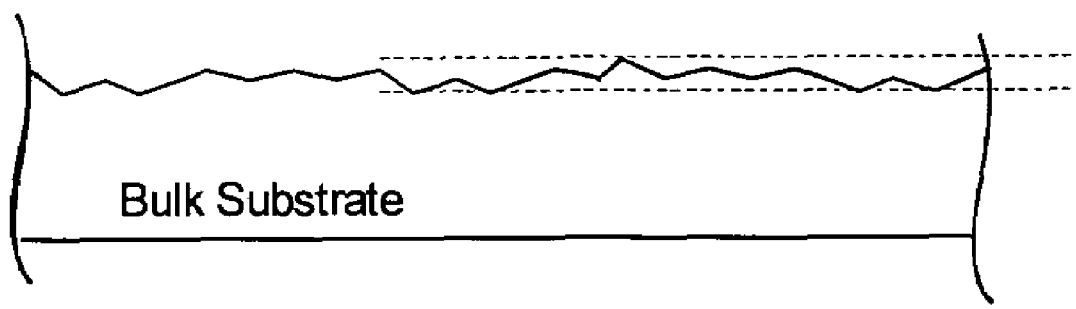
FIG. 1 is a simplified cross-sectional diagram of the surface of ordinary glass, illustrating surface roughness.

Disclosed herein is a new method for creating specific patterns images and designs in glass and other silica containing substrates, plastic substrates, or other transparent or translucent materials, found, for example, in refrigerator and freezer doors, windows, or other covered areas, that only appear to the human eye when condensation or other moisture is present. Although described in terms of transparent or translucent surfaces commonly associated with refrigerator and/or freezer doors, the surfaces described herein may be characterized in terms of any form of fenestration. Thus, the window, door or covering terminology shall not be considered as limiting in any manner, but rather as exemplary and illustrative.

A glass or other silica containing surface is masked or stenciled off randomly or in a specific pattern or design and treated with a liquid or vapor chemical composition that randomly or by specific pattern fills in the microscopic valleys and pits found in all types of glass and silica containing surfaces, imbedding that random or specific pattern (image) into or onto the substrate. After the liquid or vapor chemical composition is applied, the mask or stencil is removed. Alternatively, the mask or stencil might include portions comprised of colored vinyl or some other such material that may be allowed to remain on the glass or plastic surface after the transfer is completed. A colored material (colored or highly contrasting) draws a person's eye toward the surface and tends to highlight the area that has been treated.

At this stage the random or specific pattern is not visible to the naked human eye. The liquid or vapor chemical composition is typically transparent and has an index of refraction similar to the substrate material such that the image is not readily visible when the glass surface is at thermal equilibrium in a particular environment. As the environment is changed, i.e., as when moisture is introduced to the surface, the image appears as a differential "shadow" pattern on the glass surface. Moisture may be introduced to the surface by any method including, but not limited to the following. Natural condensation-which happens from the occurrence of a large enough thermal difference between the ambient temperature and the surface temperature of the glass or other silica containing surface and mechanical condensation-including misting, fogging, spraying, blowing, sputtering or steaming of any liquids and any systems, manual or power driven that can accomplish it.

Under application of condensation, the imbedded random or specific pattern (image) appears to the naked human eye and stays visible for as long as the moisture is present. The images that may form include specific logos and other marketing and promotional or design artwork and text as a means of branding a product or service or some other specific type of communication on refrigerator or freezer door glass and silica containing surfaces. A colored material, such as a colored vinyl, tends to draw a person's attention to the exemplary door and increases the probability that such an interested person will open the door, thereby inducing condensation and implementing the desired inventive effect.

It is well understood in the art that thermal differences between an ambient environment and a surface will induce condensation on the surface, so long as the ambient is warmer than the surface. As a refrigerator or freezer door is opened, the door enters a warmer environment and the temperature difference causes moisture condensation on the cooler surface. Condensation is also well known to be a function of surface texture; i.e., a certain amount of surface texturing will allow moisture (condensation) to adhere to the surface.

As depicted in the exemplary embodiment of FIG. 1, all glasses have an inherent amount of surface roughness (texture). Even optical quality borosilicate glasses exhibit surface texturing in the nanometer range (approximately 5 to 20 nm). Ordinary glass exhibits surface texturing of from about 200 to about 1000 nanometers, with even larger values being common. Surface texturing is characterized by microscopic irregularities (peaks and valleys) that are non-uniform and look similar to a relief plot of a mountain range. It is this characteristic surface texturing that allows moisture buildup on a glass thermal differential surface as condensation. As the cooler surface is introduced into a warmer ambient the thermal difference extracts water vapor from the surrounding air which then "beads" onto the surface in droplets which, in turn, adhere to the texturization through surface tension.

Air entrapment, or bubbles, trapped in the glass during mixing or forming, can result in bubbles or crater like defects in the cured glass sheet. Similarly, bumps and sinks are high and low spots caused by unwanted flows which occur during curing after initial leveling or shaping and are frequently caused by surface tension gradients during curing. Cratering is the formation of small bowl shaped depressions in a film and may be caused by particles, dirt, fibers, or other surface or substrate contamination. All of these, as well as numerous other defects may be introduced into a glass substrate during the manufacturing process, but this is not the only mechanism by which glass may be textured.

Once installed, glass can withstand large amounts of water without significant surface damage. However, glass in contact with water enters into a series of complex chemical reactions, which result in alkaline solutions. The trapped water reacts slowly initially, but in time the reaction accelerates, resulting in a rapidly increasing alkali concentration. The alkaline solution attacks the glass surface by dissolving away surface ingredients (sodium) which results in hazing and roughness. Initial attack may cause only a faint whitening of the glass surface due to the change from a glassy silicate structure to a crystalline silicate structure. At this stage, a light polishing or special chemical treatment would probably restore the glass surface, but at the expense of additional surface roughening by action of the polishing agent.

Certain chemicals can also deteriorate glass surfaces. While glass is resistant to most acids, even dilute forms of hydrofluoric and phosphoric acids quickly react with silica in glass. A variety of other chemicals can also attack glass surfaces. These substances are transmitted in airborne sprays and mists. They can be carried for some distances, not only in industrial, but also in rural and residential areas. Even solid particulates can break down into destructive compounds when held against glass surfaces by water condensation. Even water alone can be a surface damaging agent of glass. Certain types of hard water, for instance, may leave harmful deposits if allowed to dry on glass surfaces. These deposits can be formed in washing or rinsing the glass, or accidentally by the evaporation of water from such sources as sprinklers or misters.

Each of these structures and/or mechanisms contributes to the roughness of the surface, which in turn affects the degree to which a drop of water wets the surface. Those having skill in the art have established that increasing the roughness of a surface causes the contact angle between that surface and a drop of liquid to move away from 90° (in either direction). Greater contact angles signify smaller areas of contact between the drop and the surface, and therefore less surface wetting, leaving liquid droplets substantially in place.

Surface roughness is measured by instruments that measure vertical deviations when traversing the material surface. Ra is the most commonly used parameter to describe the average surface roughness and is defined as an integral of the absolute value of the roughness profile measured over an evaluation length:

$$Ra = \frac{1}{l} \int_0^l |z(x)| dx$$

The average roughness is the total area of the peaks and valleys divided by the evaluation length, it is expressed in μm (i.e., microns or thousandths of a millimeter). Center line average (CLA) and arithmetic average (AA) are older designations for average surface roughness.

Figure 2:
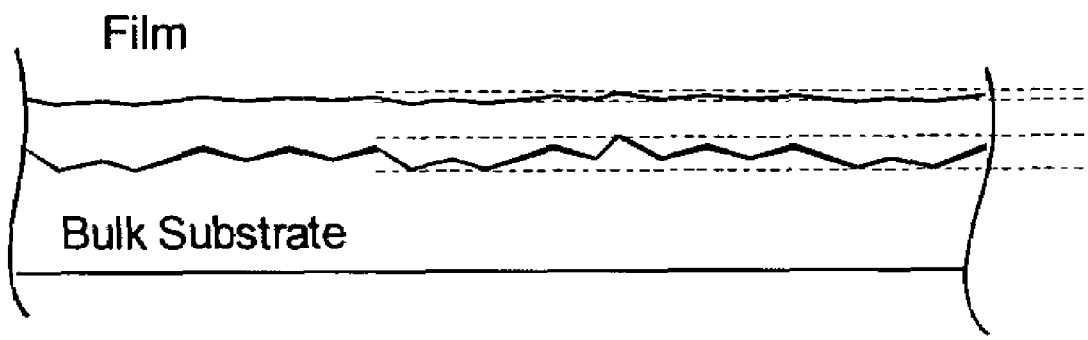
FIG. 2 is a simplified cross-sectional diagram of the surface of ordinary glass, illustrating surface texture after application of a film in accord with the present invention.

As depicted in the exemplary embodiment of FIG. 2, in the context of the present invention, it is sufficient to provide a formulation, liquid or chemical composition that exhibits a surface roughness (Ra) one order of magnitude less than that of the underlying glass surface, once the formulation, liquid or chemical composition is applied thereto. This difference in surface roughness is sufficient to change the incidence (contact) angle between the surface and a drop of liquid, formed by condensation, to one up to 180°.

Figure 3:
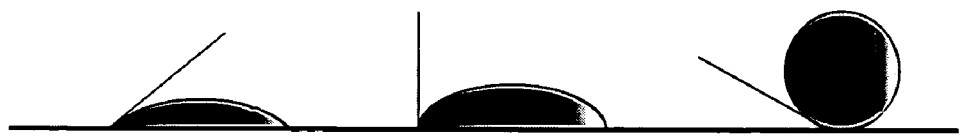
FIG. 3 is a semi-schematic diagram of incidence angles of exemplary condensation droplets illustrating wetting and droplet formation.
Figure 4:
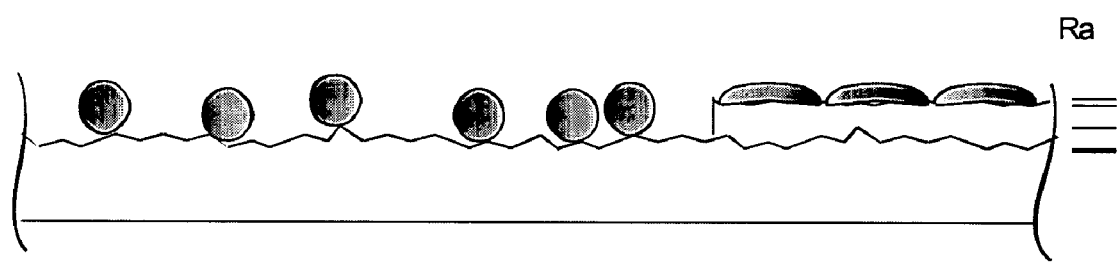
FIG. 4 is a simplified, semi-schematic, cross sectional diagram of the surface of ordinary glass, illustrating droplet formation on the native glass surface and wetting on the glass surface after application of a film in accord with the present invention

At any liquid-solid surface interface, if the molecules of the liquid have a stronger attraction to the molecules of the solid surface than to each other (the adhesive forces are stronger than the cohesive forces), then wetting of the surface occurs. Alternately, if the liquid molecules are more strongly attracted to each other and not the molecules of the solid surface (the cohesive forces are stronger than the adhesive forces), then the liquid beads-up and does not wet the surface of the material. As seen in FIGS. 3 and 4, normally forming condensation droplets exhibit a spherical shape due to the effects of surface tension and a smaller contact area (larger contact angle) between the drop and the surface. The smaller contact area results in a reduction in the liquid-solid interface area and a consequent reduction in the adhesive forces. Conversely, condensation droplets forming in contact with the treated surface have much lower contact angles, due to the lower degree of surface roughness and greater liquid-solid surface interface area, and consequently a higher ratio of adhesive forces to cohesive forces (surface tension). Wetting preferentially occurs in those areas smoothed by the formulation, liquid or chemical composition, while condensation droplet formation preferentially occurs on untreated surfaces. It should be noted, however, that the effect is visibly perceived in reverse, i.e., those areas that have been treated, in accord with the present invention, will have a "cloudy" appearance such that the bulk surface appears "clear" while the image shows up as a "cloudy" or contrasting area.

Under certain conditions, the present invention might be viewed as having a mechanical characteristic and a chemical characteristic. In the sense of having a mechanical characteristic, it will be understood that a formulation, liquid or chemical composition, according to the invention, will be appropriate so long as it exhibits a surface roughness (Ra) approximately one order of magnitude less than the underlying glass surface. The actual chemical properties of the formulation are less important than its Ra as applied. This mechanical characteristic of the invention relies on the smoothing properties of the material surface and its consequent effects on the liquid-solid interface area of a forming condensation droplet.

In the context of having a chemical characteristic, it will be understood that a formulation, liquid or chemical composition, according to the invention, will be appropriate where it also exhibits a surface roughness (Ra) less than the underlying glass surface, but also exhibits stronger adhesive forces on a forming condensation droplet by chemical bonding, in a manner similar to the effects of a wetting agent. Naturally, a combination of the two mechanisms (mechanical and chemical) will provide a quite satisfactory formulation, liquid or chemical composition to apply onto a glass substrate.

Additionally, the chemical characteristic may be provided with moisture repellant properties that function to reduce the adhesive forces to minimal levels. In this regard, the composition might be comprised of chains of dimethylsiloxane (DMS) functional groups which is chemically bonded to the surface of a glass substrate through a, for example, an Oxygen moiety. The film may be subsequently treated with trimethylchlorosiloxane in order to remove any hydrophilic surface constituents through substitution of inert components. Complete details of films of this type, as well as abrasion resistant films having similar characteristics may be found in U.S. Pat. No. 6,245,387, commonly owned by the assignee of the present invention, the entire contents of which are expressly incorporated herein by reference.

It will also be understood that the composition, whether devised to mechanically or chemically (or both) promote wetting, must be able to adhere to the underlying glass film sufficiently to create a surface film that is not removed or substantially diluted after only a few cycles of passage from a cooler ambient to a warmer ambient and the consequent moisture formation.

In the case of the present invention, a formulation is applied to localized portions of a glass surface, particularly the inside surface which is in thermal equilibrium with the ambient inside the refrigerator or freezer. The formulation is devised of a liquid or vapor chemical composition which may be flowed, wiped, painted, sprayed, or otherwise applied to the glass, and which has a characteristic molecular chemical composition that results in an exterior surface having a surface roughness (Ra) less than that of the glass, preferably an Ra about one order of magnitude less than the Ra of the native surface. In effect, the formulation fills in the characteristic microscopic valleys found in virtually all glass and silica containing (and alumina containing) surfaces.

Liquid and vapor chemical compositions that may be used to fill in the microscopic valleys and pits found in all types of glass and silica containing surfaces include, but are not limited to, the above mentioned silicone films, with or without cross linking, branching or capping; created with any type of silane containing formulae. Such silicone films and formulae are disclosed and described in U.S. Pat. No. 6,245,387, commonly owned with the present invention, the entire contents of which are expressly incorporated herein by reference. Other suitable compositions include:

Silica and silane containing formulations
Siloxanes and silicon oils
Diamond-Like Carbons
Polymers and Multi-Polymers
Petroleum distillates
Liquid plastics
Acrylics
Resins-thermoplastic and others
Alcohols
Esters
Ethers
Copolymers
Oligomers
Ethoxys
Acetoxys
Acetates It should be understood, that the foregoing is a representative and illustrative list of suitable compositions and is not intended to be limiting in any manner. All that is necessary for practice of the present invention is that the composition have a surface texture (surface roughness), after application, of about an order of magnitude less than the surface texture of the glass substrate material.

Figure 5:
FIG. 5 is a semi-schematic diagram of application of a stencil on the surface of, for example, a refrigerator door.
Figure 6:
FIG. 6 is a semi-schematic diagram illustrating a design transfer to the glass surface.

As shown in FIGS. 5 and 6, the composition is applied to the substrate surface by masking or stenciling random or specific designs onto the substrate and the composition is applied to open areas of the mask or stencil. The mask or stencil is removed, and the composition remains where applied. Alternatively, the composition might be "painted" onto the substrate without use of a mask or stencil, as an artistic design.

Methods for masking or stenciling random or specific designs into the glass and silica containing surfaces include but are not limited to the use of vinyl, wax, plastic or any of the chemicals listed above that could be used to fill in the microscopic valleys and pits found in all types of glass and silica containing surfaces. Additionally, the stencil might be provided in either positive or negative form, where the design (the composition) might be introduced through openings in a stencil (negative form), or the stencil might define areas where composition transfer is precluded (positive form).

Figure 7:
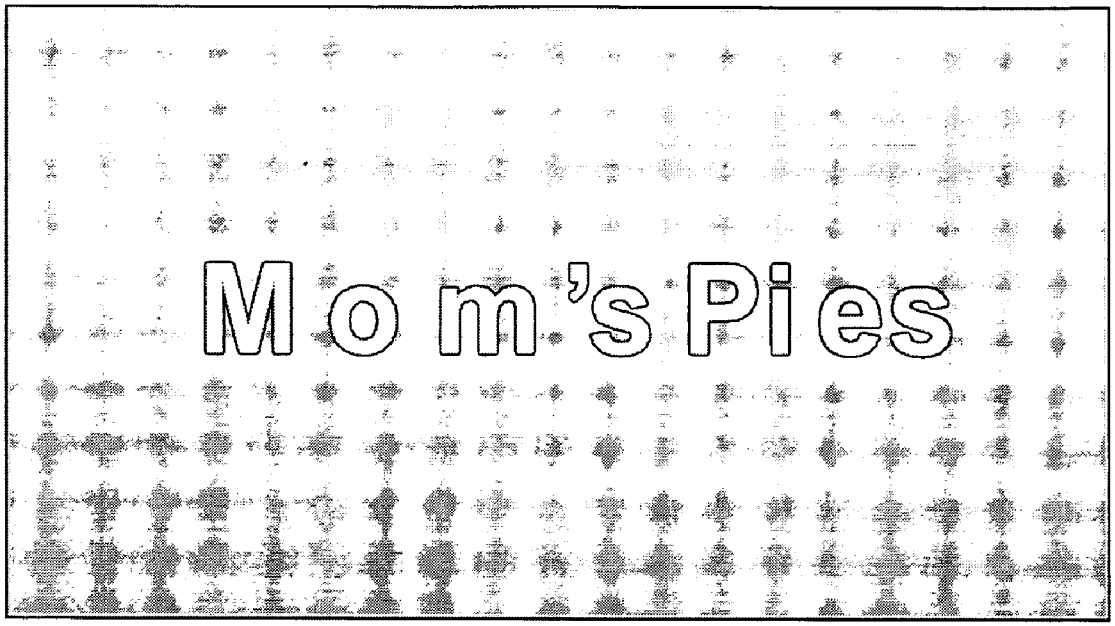
FIG. 7 is a semi-schematic diagram illustrating negative condensation formation (i.e. stencil) in an area surrounding the transferred design in accord with the invention.
Figure 8:
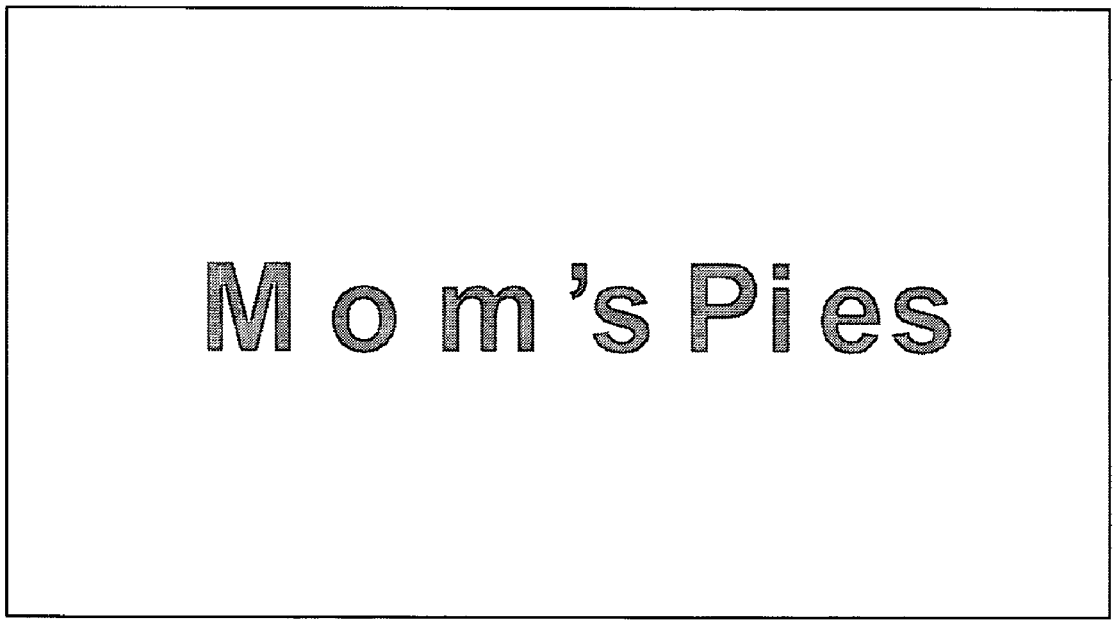
FIG. 8 is a semi-schematic diagram illustrating positive condensation formation (i.e., mask) in an area representing the transferred design in accord with the invention.

Specifically, and with reference to FIGS. 7 and 8, once the composition is applied, and the surface comes into thermal equilibrium with the ambient inside of a refrigerator or freezer, the design or pattern is invisible. As the door (glass) is opened into a warmer environment, small condensation droplets appear to form on the area treated with the composition, but do not appear to form on the normally textured glass surface area. This causes a "reverse image" to appear on the glass (as shown in FIG. 7) due to the transparency and contrast difference between the treated surface portion exhibiting condensation and the un-treated surface portion not exhibiting condensation. It should be understood that the un-treated surface portion does, technically, support some degree of condensation. However, due to the difference in surface texture size, the condensation droplet size is sufficiently different, or may resolve into a wetting regime, that the treated area is visibly different in contrast from the untreated area, making the pattern stand out in visual terms.

It should also be understood that the mask or stencil can be applied as a "negative", i.e., the mask blocks application of the composition and the design appears as an area clear of condensation in an otherwise "cloudy" substrate, as shown in the exemplary embodiment of FIG. 8.

It should further be understood that the image itself need not be "moved" between ambients, such as being applied to a door which is opened or closed. Rather, the image might be applied to a surface across which the ambient is changed. For example, were the image placed on a window, or other covering surface, that experiences a generally cool ambient at equilibrium, a jet or "breeze" of warmer air can be directed over the surface of the covering in order to produce the desired effect. This jet or breeze can be introduced on a regular, timed basis, or on a randomly timed basis, or be caused to blow on the covering as a person approaches the installation. A simple proximity sensor may be used to detect the approach of a person and the jet or breeze caused to blow across the treated surface as a result.

Images that have been imbedded may be removed by using a variety of abrasive pads, powders and compounds, depending on the chosen composition material, allowing for a new image to be imbedded as frequently as desired by the substrate owner. Alternatively, the composition might be removed by an appropriate solvent.

The invention also covers the ability to attach any other translucent or opaque plastics or silica containing materials to the refrigerator or freezer doors that have been produced offsite first to create the same effect as noted above. All that is necessary for practice of the invention is to provide a design or image that may be transferred to a transparent surface, where the design or image is implemented in a material having substantially the same index of refraction as the glass substrate and a surface roughness Ra about one order of magnitude different from the substrate.

What is claimed is:

1. A method for imaging a pattern or design on a transparent glass sheet having inner and outer surfaces, the method comprising:

providing a stencil, the stencil having open portions and a backing, together defining the pattern or design;

applying the stencil to a surface of the transparent glass sheet; and providing a transparent surface smoothing composition to the glass surface such that the composition contacts the glass surface through open regions of the stencil so as to transfer the pattern or design to the glass sheet to form a coated portion having substantially the same index of refraction as the glass sheet such that the pattern or design is not visible and the coated portion of the sheet is visually indistinguishable from an uncoated portion without a presence of moisture, wherein the pattern or design is imaged upon the glass surface as the glass surface is transitioned from a colder temperature to a warmer temperature thereby providing conditions for condensation droplets to form, the pattern or design imaged as a result of greater presence of condensation in contrast to lesser presence or absence of condensation.

2. The method according to claim 1, wherein the transparent surface smoothing composition comprises a film containing silicon.

3. The method according to claim 2, wherein the transparent surface smoothing composition is a film selected from the group consisting of siloxanes, silicon oils, diamond-like carbons, polymers, copolymers, oligomers, petroleum distillates, liquid plastics, acrylics, acetates, and resins.

4. The method according to claim 1, wherein the glass surface is characterized by a first surface roughness Ra and wherein the transparent surface smoothing composition is characterized by a second surface roughness less than the first surface roughness.

5. The method according to claim 4, wherein the second surface roughness is about one order of magnitude smaller than the first surface roughness.

6. The method according to claim 1, wherein the glass sheet is provided as an exterior door or covering to a refrigerator or freezer, and wherein transitioning the glass surface from the colder temperature to the warmer temperature comprises opening or closing the door or covering of the refrigerator or freezer, thereby causing condensation.

7. The method according to claim 1, wherein the glass sheet is provided as an exterior door or covering to a refrigerator or freezer, and wherein transitioning the glass surface comprises changing an ambient temperature from cooler to warmer, thereby causing condensation.

8. A method for imaging a pattern or design on a transparent material sheet having inner and outer surfaces, the method comprising:
defining the pattern or design for transfer to the transparent material sheet;
providing transfer means for hosting and supporting the pattern or design;
applying a surface smoothing composition to the transfer means which is used to apply a coating to the transparent material sheet to form a coated portion having substantially the same index of refraction as the transparent material sheet such that the pattern or design is not visible and the coated portion of the sheet is visually indistinguishable from an uncoated portion of the sheet without a presence of moisture,
wherein the pattern or design is imaged upon the transparent material sheet as a surface of the transparent material sheet is transitioned from a cooler temperature to a warmer temperature thereby providing conditions for condensation droplets to form, the pattern or design imaged as a result of greater presence of condensation in contrast to lesser presence or absence of condensation.

9. The method according to claim 8, wherein the transfer means comprises a stencil having open portions and a backing, together defining the pattern or design.

10. The method according to claim 9, wherein the surface smoothing composition is applied to the surface of the transparent material sheet such that the composition contacts the transparent material sheet surface through open regions of the stencil so as to transfer the pattern or design to the transparent material sheet, the composition having substantially the same index of refraction as the transparent material sheet such that the pattern or design is not visible when the composition and transparent material sheet are in thermal equilibrium.

11. The method according to claim 8, wherein the transfer means comprises a substrate material having the same index of refraction as the transparent material sheet, the surface smoothing composition applied to the substrate material through a stencil or mask defining the pattern or design.

12. The method according to claim 8, wherein the transparent surface smoothing composition comprises a film containing silicon.

13. The method according to claim 8, wherein the transparent surface smoothing composition is a film selected from the group consisting of siloxanes, silicon oils, diamond-like carbons, polymers, copolymers, oligomers, petroleum distillates, liquid plastics, acrylics, acetates, and resins.

* * * * *